United States Patent
Kristiansen

(10) Patent No.: US 12,149,031 B2
(45) Date of Patent: Nov. 19, 2024

(54) SUBSEA CONNECTOR

(71) Applicant: Siemens Aktiengesellschaft, Munich (DE)

(72) Inventor: Karstein Berge Kristiansen, Trondheim (NO)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 339 days.

(21) Appl. No.: 17/762,056

(22) PCT Filed: Sep. 21, 2020

(86) PCT No.: PCT/EP2020/076239
§ 371 (c)(1),
(2) Date: Mar. 19, 2022

(87) PCT Pub. No.: WO2021/063716
PCT Pub. Date: Apr. 8, 2021

(65) Prior Publication Data
US 2022/0393407 A1    Dec. 8, 2022

(30) Foreign Application Priority Data

Oct. 2, 2019  (GB) ..................................... 1914190

(51) Int. Cl.
*H01R 13/70* (2006.01)
*E21B 33/038* (2006.01)
*H01H 1/00* (2006.01)
*H02G 9/00* (2006.01)

(52) U.S. Cl.
CPC ......... *H01R 13/70* (2013.01); *E21B 33/0385* (2013.01); *H01H 1/0036* (2013.01); *H02G 9/00* (2013.01)

(58) Field of Classification Search
CPC .. H01R 13/70; E21B 33/0385; H01H 1/0036; H02G 9/00
See application file for complete search history.

(56) References Cited

U.S. PATENT DOCUMENTS 8,111,502 B2 *  2/2012  Rocke ................. E21B 33/0355
                                                                361/603
2017/0369130 A1  12/2017  Cardona

FOREIGN PATENT DOCUMENTS

| CN | 109725255 A    | 5/2019 |
| DE | 102016215001 A1 | 2/2018 |
| EP | 2337043 A1     | 6/2011 |

(Continued)

OTHER PUBLICATIONS

International search report and written opinion dated Feb. 15, 2021, for corresponding PCT/EP2020/076239.

*Primary Examiner* — Aaron L Lembo
(74) *Attorney, Agent, or Firm* — Wolter Van Dyke Davis, PLLC

(57) ABSTRACT

A switchable subsea connector includes a first connector part, a second connector part removably connected to the first connector part; and a switching unit. The connector parts each include at least one electrical conductor and each switching unit includes at least one individual switching device. Each electrical conductor in at least one connector part is allocated to an individual switching device of the switching unit; wherein each of the individual switching devices includes a micro-electro-mechanical systems (MEMS) switch.

16 Claims, 4 Drawing Sheets

(56) References Cited

FOREIGN PATENT DOCUMENTS

| | | |
|---|---|---|
| GB | 2152302 A | 7/1985 |
| GB | 2214004 A | 8/1989 |
| JP | 2009087709 A | 4/2009 |

\* cited by examiner

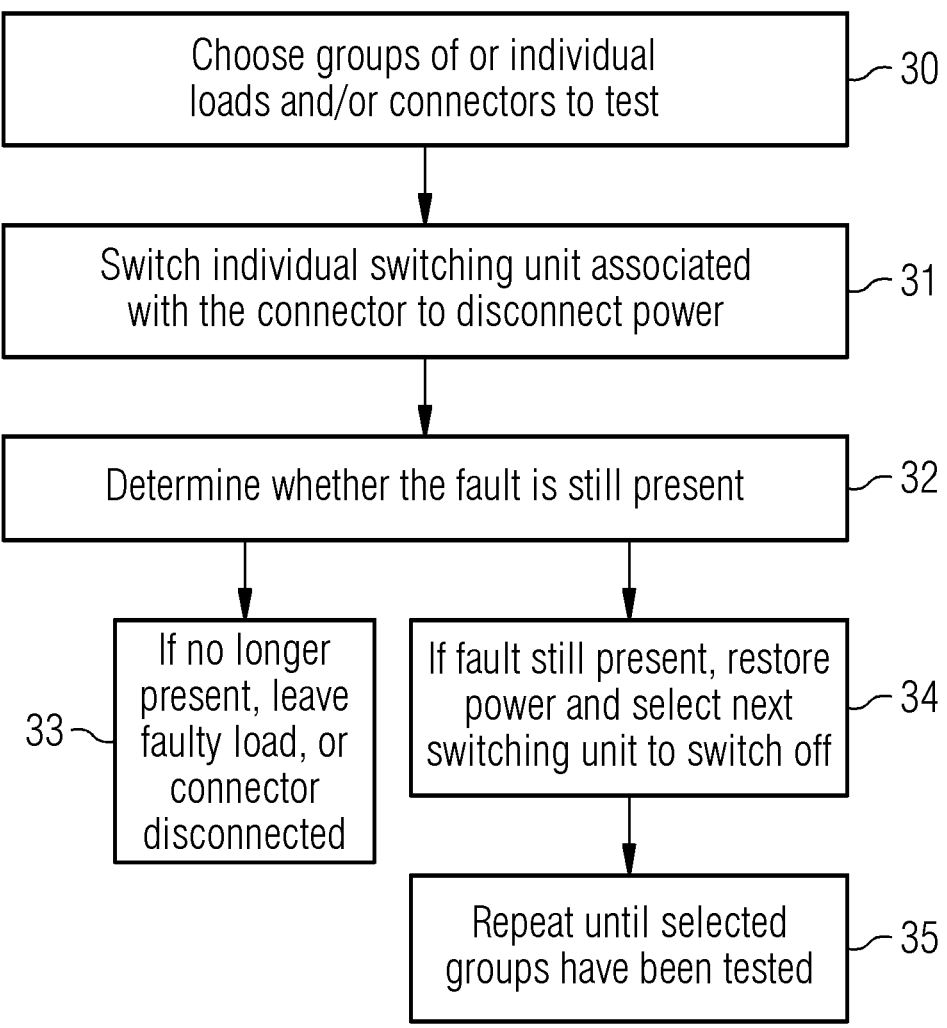

SUBSEA CONNECTOR

CROSS REFERENCE TO RELATED APPLICATIONS

This application is the US National Stage of International Application No. PCT/EP2020/076239 filed 21 Sep. 2020, and claims the benefit thereof. The International Application claims the benefit of United Kingdom Application No. GB 1914190.2 filed 2 Oct. 2019. All of the applications are incorporated by reference herein in their entirety.

FIELD OF INVENTION

This invention relates to a switchable subsea, or underwater, connector and a method of operating the connector.

BACKGROUND OF INVENTION

Subsea, or underwater, connectors are designed to operate beneath the surface of the water. In some cases, the connectors are mated and de-mated subsea (i.e. wet-mateable), in other cases, they are mated and de-mated topside (dry mateable). For installation of wet-mateable connectors, this may be at locations in deep water, where the operating pressures become significant and mating and de-mating is carried out by a robot arm of a remotely operated vehicle, or by saturation divers. For safety reasons, it is necessary to ensure that there is no electrical potential on the connector pins when carrying out the wet-mate, or de-mate. Whether wet mate or dry mate connectors, the subsea installation also makes repair and maintenance challenging and improvements are desirable.

Conventionally, this requirement for mating of the connectors has been addressed by switching off all power at the nearest transformer or substation, which may be topside, or subsea. However, this can have a knock-on effect on other equipment supplied from that source and in particular, in the case of maintenance and repair, rather than installation, the operators would prefer to avoid these kinds of wholesale shutdown.

SUMMARY OF INVENTION

In accordance with a first aspect of the present invention, a switchable subsea or underwater connector comprises a first connector part, a second connector part removably connected to the first connector part; and an associated switching unit; the connector parts each comprising at least one electrical conductor; each switching unit comprising at least one individual switching device, wherein each electrical conductor in at least one connector part is allocated to an individual switching device of the switching unit; wherein each of the individual switching devices comprises a micro-electro-mechanical systems (MEMS) switch.

Each electrical conductor may be allocated an individual switching device, or groups of conductors may be allocated to an individual switching device. The switching unit may be incorporated into the connector, or separate from, but electrically coupled to the connector.

The switching unit may be mounted in a 1 atmosphere pressure chamber, coupled to a body of the connector The switchable subsea connector may be a wet-mateable connector, or a dry mateable connector, for subsea or underwater use, in particular for deep water use, at high ambient pressures.

The switching unit may be incorporated into a body of the connector, in a pressurised housing of the connector body, or may be a separate module coupled behind the connector body housing in the hose, or umbilical, or in a separate pressurised housing.

Typically, the switching units may switch up to 1000 VDC, in particular, between 100 VDC to 460 VDC and with a maximum current of 7 A.; or the switching units may switch up to 1000 VAC, in particular between 100 VAC to 750 VAC and with a maximum current of 7 A.

The system of the second or third aspect may further comprise a controller for controlling switching of each individual switching device by sending a control signal to at least one switching device.

The controller is connected to individual switching devices by an Ethernet or CAN bus network.

The controller may be located in the switching unit, or the controller may be distributed in the connectors.

In accordance with a second aspect of the present invention, a subsea power distribution system comprises a plurality of power inputs to a plurality of connectors and a decentralised switching unit comprising individual switching devices in each connector.

The connectors may comprise connectors according to the first aspect.

In accordance with a third aspect of the present invention, a subsea power distribution system comprises a power distribution unit, a plurality of electrical loads; and a centralised switching unit comprising individual switching devices for each load, each individual switching device being associated with a connector according to the first aspect.

In accordance with a fourth aspect of the present invention, a method of operating the systems of any of the second or third aspect comprises providing individual control of subsea electrical connectors in systems which have a centralised arrangement, or a decentralised arrangement for power distribution.

In accordance with a fifth aspect of the present invention, a method of determining a location of a faulty device in a subsea power distribution system of the second or third aspect comprises switching individual conductors or pins, groups of conductors or pins or sections of conductors or pins in a connector on and off to identify a faulty device.

BRIEF DESCRIPTION OF THE DRAWINGS

An example of a subsea connector and associated method of operation in accordance with the present invention will now be described with reference to the accompanying drawings in which:

FIG. 7 is a flow diagram illustrating a method of operating the subsea connector.

DETAILED DESCRIPTION OF INVENTION

Figure 1:
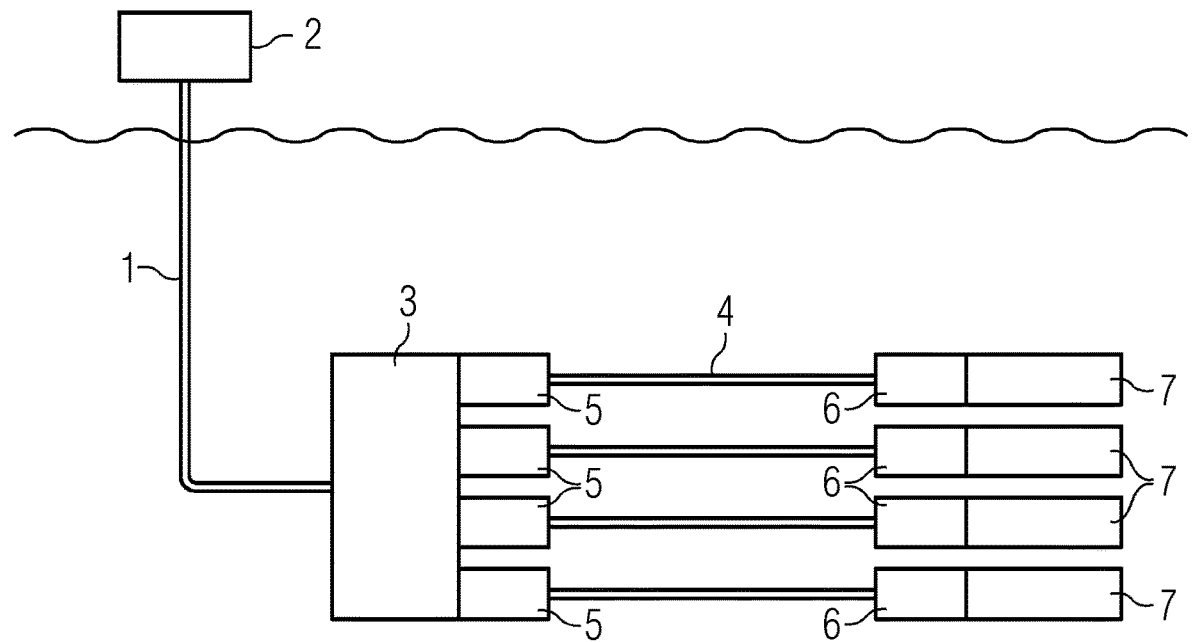
FIG. 1 is a block diagram of an example of a system incorporating a subsea connector according to the present invention.

In the energy market, in particular oil and gas, more and more equipment is being installed on the seabed instead of being located on an offshore installation. Such subsea installations include subsea trees of various configurations, which may have monitoring, control or production related characteristics. One well known subsea tree production unit is known as Christmas tree, or XT. Conventionally, these XTs have relied on hydraulic power and only used small amounts of electrical power for a control node containing some simple logic. However, there is a desire for an all-electric XT to be developed. Amongst the benefits of changing from hydraulic to electrical power for controlling operation of these subsea trees is that the capital and operating costs can be reduced and that electrical operation allows further technology to be added. As electrical actuators tend to have a faster response time than hydraulic ones, this opens up the opportunity to carry out subsea processing, such as providing anti-surge sets, or subsea filters. Once the switching is all electrical, rather than hydraulic, then a greater switching granularity is required. Even very low percentage increases in production rate may have significant financial benefits for the operator.

Other topside activities which might be located subsea in future include processing setups and storage of crude oil. Conditions subsea are very different from conditions topside and the environment in which equipment must work has to take account of high temperatures and high pressures which are experienced at depth. Although any electrical equipment which is underwater (even if only by a few metres) has to be properly protected to prevent water ingress, the main applications are in deep water. At depths of up to 4000 metres, the pressures can be up to 440 bars, due to the effect of both the atmospheric pressure at sea level and the hydrostatic pressure due to the weight of the water column above the equipment. This gives rise to special considerations for subsea operation.

The devices which are currently located topside, but which in future may be installed subsea and required to operate subsea, may have a need for electrical power in subsea operation. If a device that is located and operating subsea is to be retrieved, such as for maintenance, repair or replacement, then the power supply to any of these subsea devices or units needs to be independently switchable. This is because the power supply to any particular unit located subsea has to be disconnected, so that there is no electrical potential on that unit when it is retrieved, whilst permitting all the other subsea units to continue to operate normally. As previously mentioned, there may be significant costs involved if the retrieval of a single, or a few, units results in any halt to the production or exploration processes more generally. Currently, the required switching granularity does not exist for power distribution to subsea units, so other units which do not have any fault or need replacement may also have to be disconnected, for example, by cutting off power at the nearest transformer, or junction box.

Another consideration is that whenever mating and de-mating of electrical connectors is carried out, whether topside by technicians, or subsea, by a robot arm of a remotely operated vehicle, or by a diver, it is necessary to ensure that there is no electrical potential on the connector pins when carrying out the mate, or de-mate to ensure the safety of the operator. As will be described in more detail below, a typical connector comprises one or more connector pins, which may carry power, or data, in both cases relying on electrical current and voltage. It is important to avoid contact between the operator and the pins when they carry an electrical potential and subsea it is also necessary to prevent the pins from coming into contact with water when the pins carry an electrical potential. It is desirable that control of the switches can be performed by personnel located either topside or onshore, so power switches on the seabed need to be remotely operable, rather than relying on the diver or robot to cause the electrical potential to be switched off, although in some cases, that facility may be provided.

A typical wet mateable connector design protects the pin within each part (plug or receptacle) and prevents it from being exposed to seawater. As the mating is carried out, the protective medium washes any sea water from the pins before they come into contact. An example of wet mateable connector is described in WO2014195100. An example of a dry mateable connector is described in WO2017133950. An example of both plug and receptacle parts of an underwater electrical connection and termination assembly is illustrated in EP2665135. All of these documents are incorporated herein by reference.

Conventionally, electrical switching has been by means of electro-mechanical relays, or more recently, semiconductor switches. In both cases these are used in conjunction with separate galvanic isolation. A problem with relays is that they are relatively slow to operate. Semiconductor switches are faster, but still lack galvanic isolation. Both mechanical relays and solid-state relays are comparable in size and weight, although they have different properties in terms of heat dissipation and ease of use. Solid state relays have the advantage over mechanical relays that they have no moving parts, but the disadvantage that there is a voltage potential on the outlet when not closed.

The switching unit of the subsea connector of the present invention comprises one or more micro-electro-mechanical systems (MEMS) switches. These have the advantages of being significantly faster acting that relays, switching in as little as $\frac{1}{10}^{th}$ of the time that a mechanical or solid-state relay might take, for example, in some cases able to switch in 1 millionth of a second. MEMS switches are significantly smaller, again, they may be as little as $\frac{1}{10}^{th}$ of the weight of mechanical or solid-state relays, for example with dimensions of the order of only hundredths of a micrometre. They may have no moving mechanical parts, no voltage potential on the outlet when not closed and have the advantage over solid state relays of integral galvanic isolation, simplifying the overall circuit design. The switching unit may be used with wet or dry mateable connectors. The subsea connector may comprise a pressure chamber, for the switching unit, typically at 1 atmosphere (101,325 pascals), which is coupled to the connector body in which the connector pins are housed. The pressure chamber may form an extension of the connector body, be mounted separately, for example in the hose or umbilical, or be in a separate unit. The pressure chamber is designed to be able to withstand external pressures greater than 1 atmosphere and in most subsea applications, significantly greater than 1 atmosphere, so that the electrical equipment within the chamber does not experience these greater external pressures. Electrical potential on each of the connector pins may be separately switched on or off by means of a control signal to a switch in the switching unit in its pressure chamber U.S. Pat. No. 8,570,713 describes the concept of using a MEMS switch and hybrid arcless limiting technology as a circuit breaker in an electrical distribution system to pass and/or interrupt current between electrical mains and branch circuits. The MEMS devices are controlled by a MEMS control board that monitors current and voltage. In the event of a current or voltage fault, the MEMS control board signals the MEMS device(s) to open and interrupt current flow. The use of a MEMS control board removes the need to provide dedicated ground fault, arc fault and short circuit monitoring at each circuit breaker.

However, the concept of using MEMS switches in subsea connectors is quite new. The present invention allows individual control of subsea electrical connectors in systems which have a centralised arrangement, or a decentralised arrangement for power distribution. FIG. 1 illustrates an example of a centralised power distribution in which power is supplied via an umbilical 1 from a topside power source 2 to a bank of electrical switches located in one physical unit 3. A cable 4 with connectors 5, 6 at each end connects between the switching unit 3 and an electrical load 7. As illustrated, there are typically multiple cables 4, each connecting the switching unit 3 separately to individual electrical loads 7. Terminating power to the switching unit results in all loads losing power, but switching one or more switches off in the switching unit, to cut the flow of power to specific loads allows repair, replacement or maintenance to be carried out in a targeted fashion, reducing the likelihood of unnecessary interruptions to the wider system. By providing a switching unit associated with a connector and individual switching devices associated with each electrical conductor, or pin, whether one device per conductor or per group of conductors, power to loads can be controlled in a targeted fashion without the need to cut power to all loads connected to the switching unit. This is particularly useful for fault finding of installed equipment.

Figure 2:
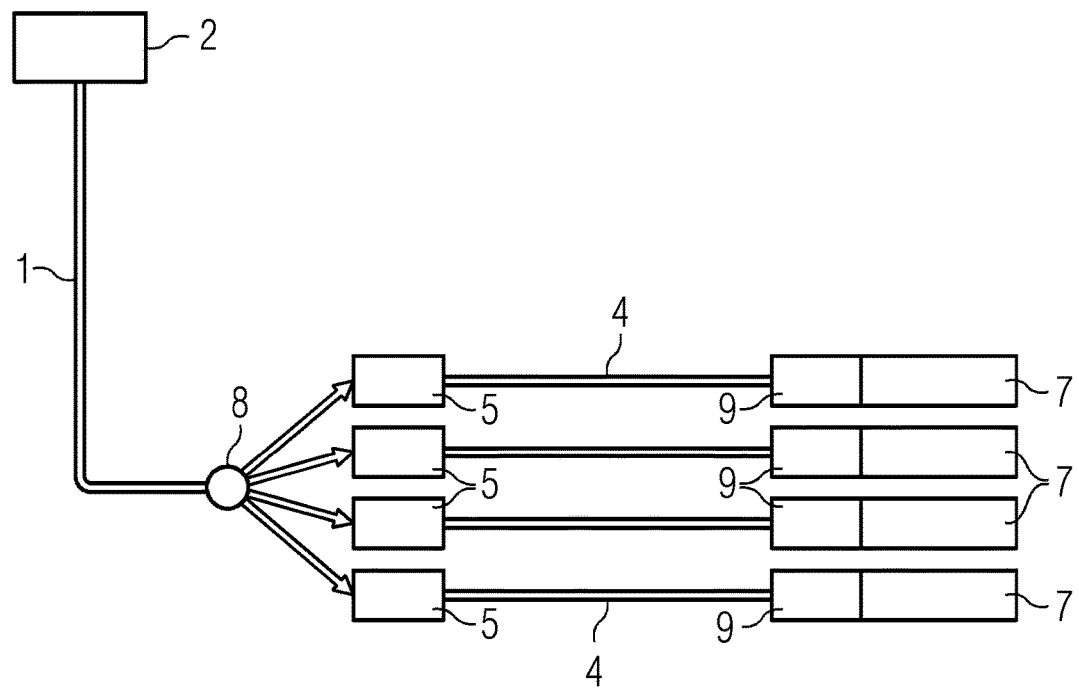
FIG. 2 is a block diagram of an example of an alternative system incorporating a subsea connector according to the present invention.

FIG. 2 illustrates an example of a de-centralised power distribution set-up in which power is also supplied from a topside power source 2 via an umbilical 1, but in this case, the power flows through a passive junction, or joint 8 and from the junction, into a connector 5 at one end of a cable 4 that connects to a switchable connector 9 at the other end of the cable and from there, power is supplied to the electrical load 7. As illustrated, there are typically multiple cables 4, each connecting to individual electrical loads 7. The electrical switch in each switchable connector 9, may be operated to disconnect power from a specific load. That terminates the electrical potential before the pins, so that even if the pins are exposed to seawater when being disconnected from the load, there will not be any meeting of power and water. In both examples, the electrical switches may be remotely operated, so that the electrical potential to the load is terminated before the ROV, or diver, mates or demates the connectors. The switchable subsea connector of the present invention may be used in either a centralised or de-centralised power distribution system, but the latter is more likely to be the case when equipment has been retrofitted, rather than for new build equipment.

Figure 3:
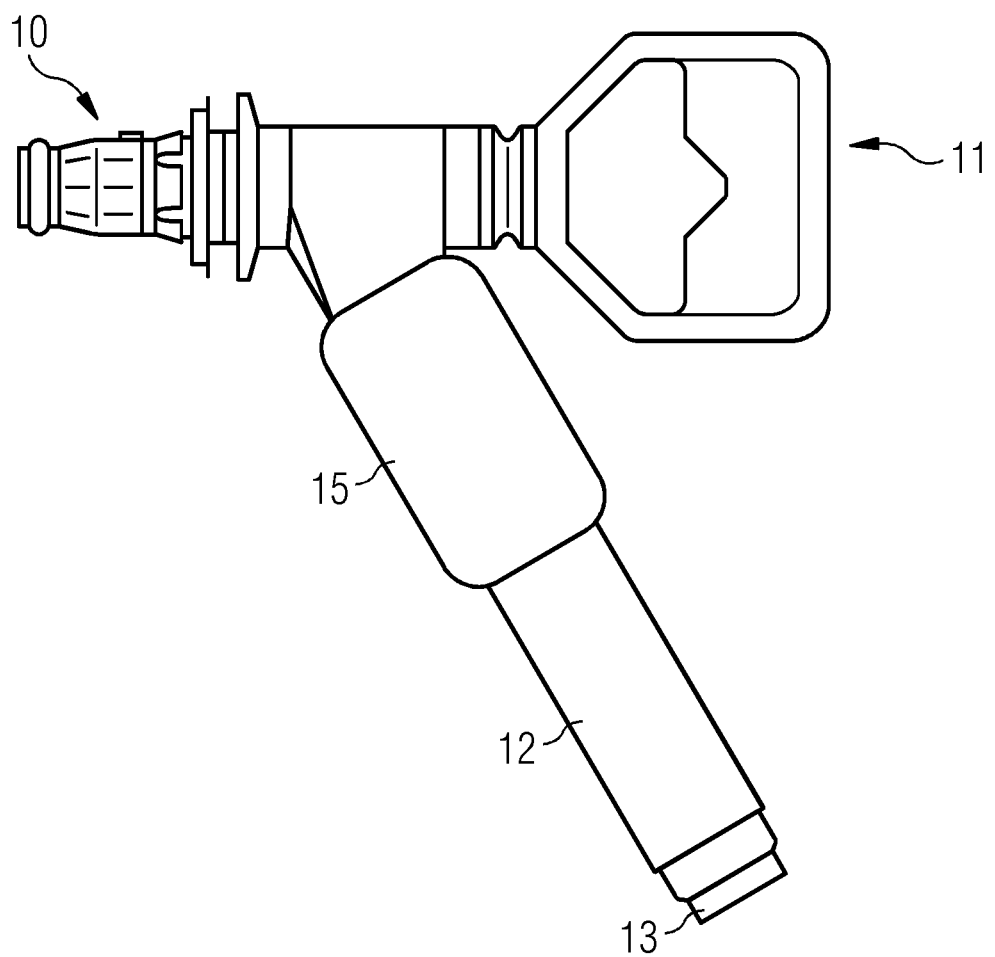
FIG. 3 shows a first example of a subsea connector according to the present invention.
Figure 4:
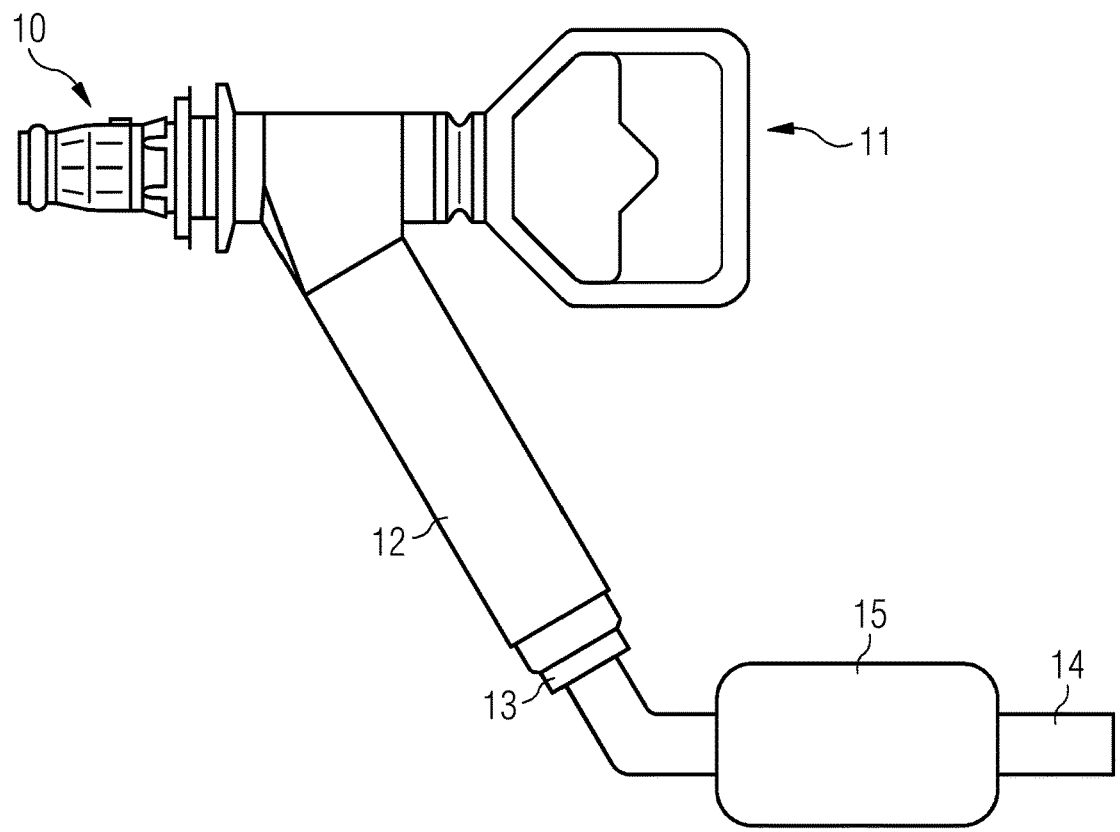
FIG. 4 shows a second example of a connector according to the present invention.

FIGS. 3 and 4 illustrate options for the location of the switching unit in an example showing an ROV mateable connector, although these options may be equally applied to diver mateable, or stab connections. The connector comprises a plug connector part 10, configured to fit into a receptacle connector part (not shown) in the switching unit 3, or junction 8, or to fit into a receptacle connector part of the load 7. A handle 11 may be fitted to allow the ROV or diver to manipulate the connector for mating or demating. An angled connector body 12 leads to a fitting 13 at which cables, hose or umbilical enter the connector. In the example of FIG. 3, the switching unit is incorporated into the body 12, in a pressurised housing of the connector body 12. In the example of FIG. 4, the switching unit is a separate pressurised module 15 coupled behind the connector body housing 12 in the hose, or umbilical 14. Alternatively, as previously described for the centralised switching arrangement, a separate switching unit may house the individual switching devices for each connector.

The switching units comprise MEMS switches, which are very small compared to conventional switches. Although electromechanical devices, such as relays are reliable and well known switching devices for topside applications, their size makes them unsuitable for incorporation into subsea devices, where volume and weight may prevent equipment being deployed, for example if space in a particular location of the connector is already limited. Effective semiconductor switches may be made in smaller packages than electromechanical relays, but semiconductor devices generate heat and so need to be of adequate size and provided with suitable cooling systems, to operate correctly. Provision of the necessary cooling may result in a switch which is too large for the space available in subsea applications. MEMS switches have the reliability benefits of relays and performance benefits of semiconductor devices, whilst being significantly smaller in overall size.

The subsea connectors described in the present application keep the size of the connector as small as possible, which is important in subsea applications and provides individually switchable connections, increasing safety. Within the connector, the switches may be mounted in a 1 atmosphere chamber, for example, at one end of the connector, to prevent the otherwise significant pressure exerted on subsea equipment from affecting the performance of the switches.

Figure 5:
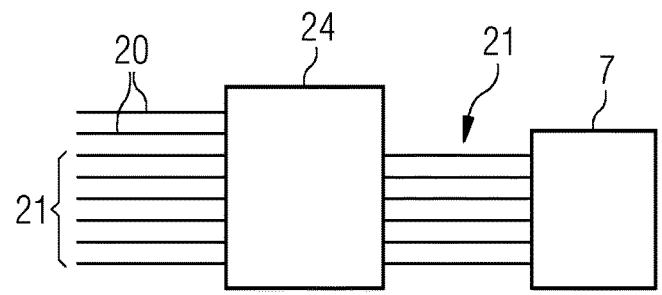
FIG. 5 illustrates a control arrangement for the example of FIG. 1.
Figure 6:
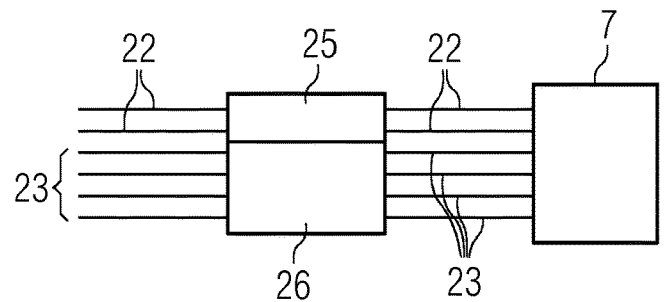
FIG. 6 illustrates a control arrangement for the example of FIG. 2.

MEMS switches operates on a small DC or AC voltage, of the order of 100s of volts. Thus, they are suitable for subsea connectors switching up to 1000 VDC, in particular, between 100 VDC to 460 VDC; or switching up to 1000 VAC, in particular between 100 VAC to 750 VAC and with a maximum current of about 7 A. The switches may be controlled directly or as described with respect to FIGS. 5 and 6. The option for control of the switches shown in FIG. 5 provides control signal connections 20 to a bank of MEMS switches 24 and separate power and communication connections 21 both to the bank of switches 24 and from the switches 24 to the load 7. An alternative shown in FIG. 6 is to have a separate controller 25 in addition to a bank of MEMS switches 26. Communication to the load is via connections 22, which pass through the controller 25 and on to the load 7. Power to the load is via connections 23 through the bank of MEMS switches 26 to the load 7.

Communication subsea, whether between two subsea devices, or from topside to a subsea device may be carried out with a suitable communication protocol, such as Ethernet or CAN bus. For example, an Ethernet connection passing through a connector may be easily connected to another Ethernet device, or controller, along a chain of devices. If required, separate cabling may be installed between the devices in the system. The MEMS switches may control switching of both power and communication connections, or only one of those, if not both were required. In distributed subsea systems, the MEMS switches may switch supply voltage to subsea process nodes.

The connector as hereinbefore described may be operated to provide individual control of subsea electrical connectors in systems which have a centralised arrangement, or a decentralised arrangement for power distribution. Switchable subsea connectors may be used to carry out a method of determining a location of a faulty device in a subsea power distribution system, the method comprising switching individual conductors, or pins, groups of conductors, or pins or sections of conductors or pins in a connector on and off to identify a faulty device. This switching may be controlled from topside via the umbilical, allowing faults in installed equipment to be located without the need for hire of a ship or divers. In some cases, after locating the faulty part, that part is switched off until a replacement can be provided.

Power or communications signals which have been switched off subsea before mating, need to be switched on again e.g. after mating has completed. This may be controlled from the end of the connector that has not been mated, by sending a signal from the controller to the switch. Typically. the switch is at one end of the connector, the end remote from the subsea power distribution hub. Alternatively, individual pins or combinations of pins may be switched off or on whilst the connector is connected, for example to determine where a fault is, without being part of any mating or de-mating activity. These may also be controlled over an Ethernet or CAN bus network. Such switching without de-mating may be used for fault finding, in both wet mate and dry mate connectors, once they are deployed subsea.

The switchable subsea connectors may be used for fault finding. FIG. 7 illustrates a method that may be used. Groups of loads and/or connectors, or individual loads and/or connectors are chosen 30 to be tested. In either case, individual switching units associated with the chosen load or connector are switched 31 to disconnect power to that load or connector. It is then determined 32 whether the fault is still present. For a group, the test is for the presence of a fault in the group to which the tested load or connector belongs. If there is no longer a fault present, then the faulty load, or connector, may be left 33 switched off, i.e. disconnected and the equipment left to operate with the still functioning parts, if that is one of a group. If the fault is still present in the group, power is restored to that entity and for a selected group, the next switching unit is switched off 34. The process is repeated 35 until all of the selected group have been tested. For a single selected load or connector, if step 33 does not apply, the process stops at step 34 and another possible source of the fault must be identified.

For example, for the subsea power distribution is implemented as in FIG. 2 with a passive joint between several outlets, the switchable subsea connector with MEMS switches as described may be used for fault finding. In this case, if one of the four outlets in the figure triggers a short circuit, the power source located topside opens its outlet. Then the MEMS switches in the connector are in an open position. If the power is then turned on again topside and the MEMS switches on the connector are turned on in a sequence, the faulty outlet can be identified. That is then set to be disconnected and thereafter, the complete subsea system, excluding the faulty switch, may be operated, with the faulty switch, or equipment having been disabled. It is particularly advantageous to operators to be able to do fault finding without needing to employ expensive vessels to send down a diver or ROV.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A switchable subsea connector, comprising:
    a first connector part,
    a second connector part removably connected to the first connector part; and
    a switching unit;
    the first and second connector parts each comprising at least one electrical conductor; each switching unit comprising at least one individual switching device, wherein each electrical conductor in at least one connector part is allocated to an individual switching device of the switching unit;
    wherein each of the individual switching devices comprises a micro-electro-mechanical systems (MEMS) switch.

2. The switchable subsea connector according to claim 1, wherein the switching unit is mounted in a 1 atmosphere pressure chamber, coupled to a body of the switchable subsea connector.

3. The switchable subsea connector according to claim 1, wherein the switchable subsea connector is a wet-mateable connector.

4. The switchable subsea connector according to claim 1, wherein the switching unit is incorporated into a body of the switchable subsea connector, in a pressurised housing of the body.

5. The switchable subsea connector according to claim 4, wherein the switching unit is a separate module coupled behind the pressurised housing of the body in a hose, or an umbilical.

6. The switchable subsea connector according to claim 1, wherein the switching units switch up to 1000 VDC; or
    wherein the switching units switch up to 1000 VAC and with a maximum current of 7 A.

7. The switchable subsea connector according to claim 1, further comprising:
    a controller for controlling switching of each individual switching device by sending a control signal to at least one switching device.

8. The switchable subsea connector according to claim 7, wherein the controller is connected to individual switching devices by an Ethernet or CAN bus network.

9. The switchable subsea connector according to claim 7, wherein the controller is located in the switching unit.

10. The switchable subsea connector according to claim 7, wherein the controller is distributed in the connector parts.

11. A subsea power distribution system, comprising: a plurality of power inputs to a plurality of connectors, and
- a decentralised switching unit comprising individual switching devices in each connector, wherein the connectors comprise switchable subsea connectors according to claim 1.

12. A subsea power distribution system, comprising:
a power distribution unit,
a plurality of electrical loads; and
a centralised switching unit comprising individual switching devices for each load, each individual switching device being associated with a connector according to claim 1.

13. A method of operating the subsea power distribution system of claim 11, comprising:
providing individual control of subsea electrical connectors in systems which have a centralised arrangement, or a decentralised arrangement for power distribution.

14. A method of determining a location of a faulty device in the subsea power distribution system of claim 11, the method comprising:
switching individual pins, groups of pins or sections of pins in a connector on and off to identify a faulty device.

15. The switchable subsea connector according to claim 6, wherein the switching units switch between 100 VDC to 460 VDC.

16. The switchable subsea connector according to claim 6, wherein the switching units switch between 100 VAC to 750 VAC and with a maximum current of 7 A.

* * * * *